United States Patent
Peterson

(10) Patent No.: US 10,156,365 B2
(45) Date of Patent: Dec. 18, 2018

(54) GAS OFF SECURITY DEVICE FOR GAS RANGE

(71) Applicant: Michael Peterson, Bloomington, IN (US)

(72) Inventor: Michael Peterson, Bloomington, IN (US)

(*) Notice: Subject to any disclaimer, the term of this patent is extended or adjusted under 35 U.S.C. 154(b) by 85 days.

(21) Appl. No.: 15/435,949

(22) Filed: Feb. 17, 2017

(65) Prior Publication Data

US 2017/0254543 A1 Sep. 7, 2017

Related U.S. Application Data

(60) Provisional application No. 62/302,087, filed on Mar. 1, 2016.

(51) Int. Cl.
*F24C 3/12* (2006.01)
*F16K 35/14* (2006.01)
*F16K 35/10* (2006.01)

(52) U.S. Cl.
CPC ............... *F24C 3/12* (2013.01); *F16K 35/10* (2013.01); *F16K 35/14* (2013.01)

(58) Field of Classification Search
CPC ........................................................ F16K 35/14
USPC ......................................................... 126/42
See application file for complete search history.

(56) References Cited

U.S. PATENT DOCUMENTS

| | | | |
|---|---|---|---|
| 599,283 A * | 2/1898 | De Freitas | F24C 3/12 |
| | | | 126/42 |
| 1,798,039 A * | 3/1931 | Selkow | F16K 35/10 |
| | | | 126/42 |
| 2,489,611 A * | 11/1949 | Becvar | F16K 35/14 |
| | | | 126/39 N |
| 2,777,316 A | 1/1957 | Mello | |
| 2,834,335 A | 5/1958 | Rondello | |
| 3,144,863 A * | 8/1964 | Pollock | F24C 15/023 |
| | | | 126/191 |
| 3,895,507 A | 7/1975 | Moy | |
| 4,363,228 A | 12/1982 | Serrao | |
| 4,922,888 A | 5/1990 | Bryan et al. | |
| 6,371,105 B1 | 4/2002 | Merritt | |
| 6,932,595 B1 | 8/2005 | Booker | |
| 7,401,610 B1 | 7/2008 | Cherry | |
| 7,549,417 B2 | 6/2009 | Dang | |
| 7,624,730 B2 | 6/2009 | Dang | |
| 8,151,785 B2 | 4/2012 | Dang | |
| 2005/0279348 A1 | 12/2005 | Cheng | |
| 2008/0283032 A1 | 11/2008 | Dang | |
| 2011/0197871 A1 | 8/2011 | Reuter | |

* cited by examiner

*Primary Examiner* — Avinash Savani
(74) *Attorney, Agent, or Firm* — Liell & McNeil

(57) ABSTRACT

A gas off security device for a gas range, which includes a cross bar sized to span a control width of the gas range, is connected to the gas range via a left mount and a right mount. Each of a plurality of knob locks are slidably mounted on the cross bar and are used to define a slot sized to receive a handle portion of one gas control knob. The knob locks can be adjusted for different gas ranges via set screws that allow the knob lock to be set at a selected location along the length of the cross bar. The gas control knob is blocked from being turned from an off position to an on position when the cross bar is mounted to the gas range and the handle portion of the control knob is received in the slot of one of the knob locks.

17 Claims, 5 Drawing Sheets

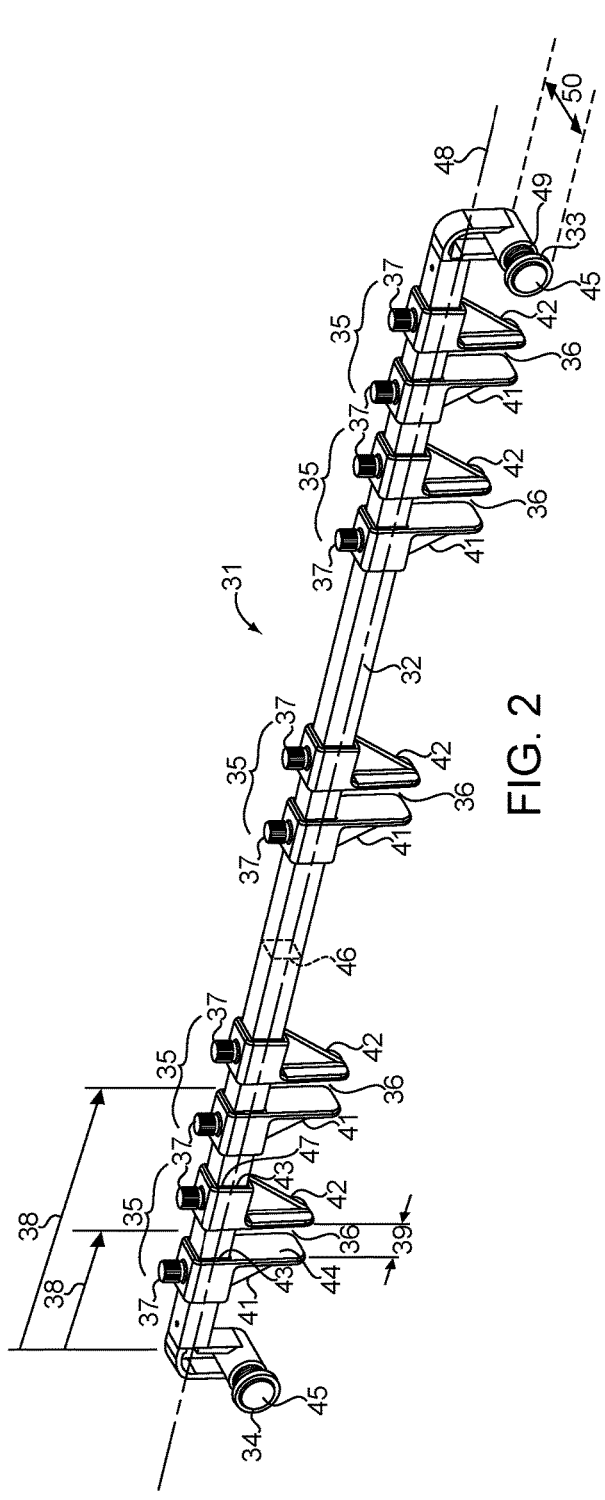
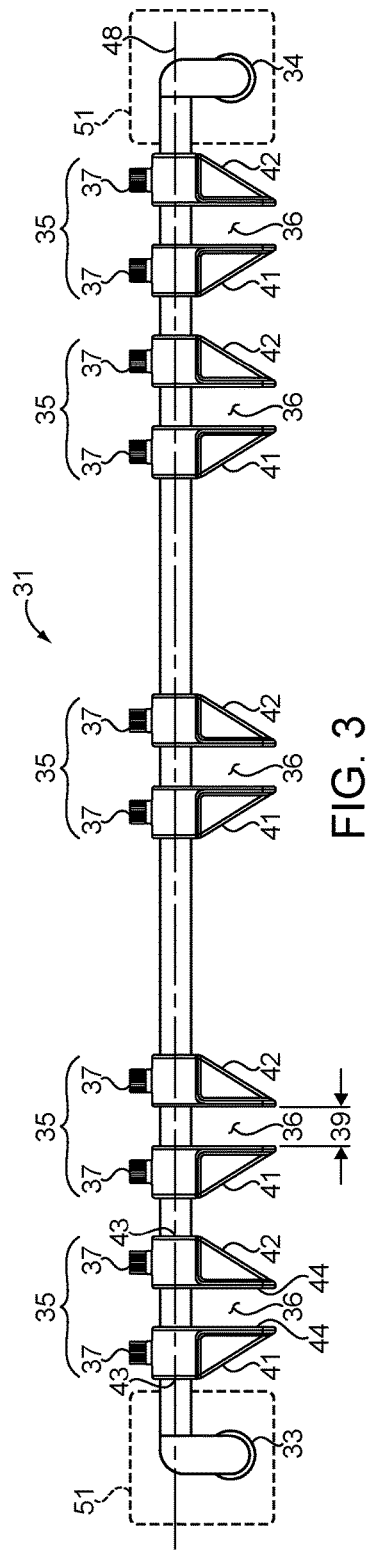

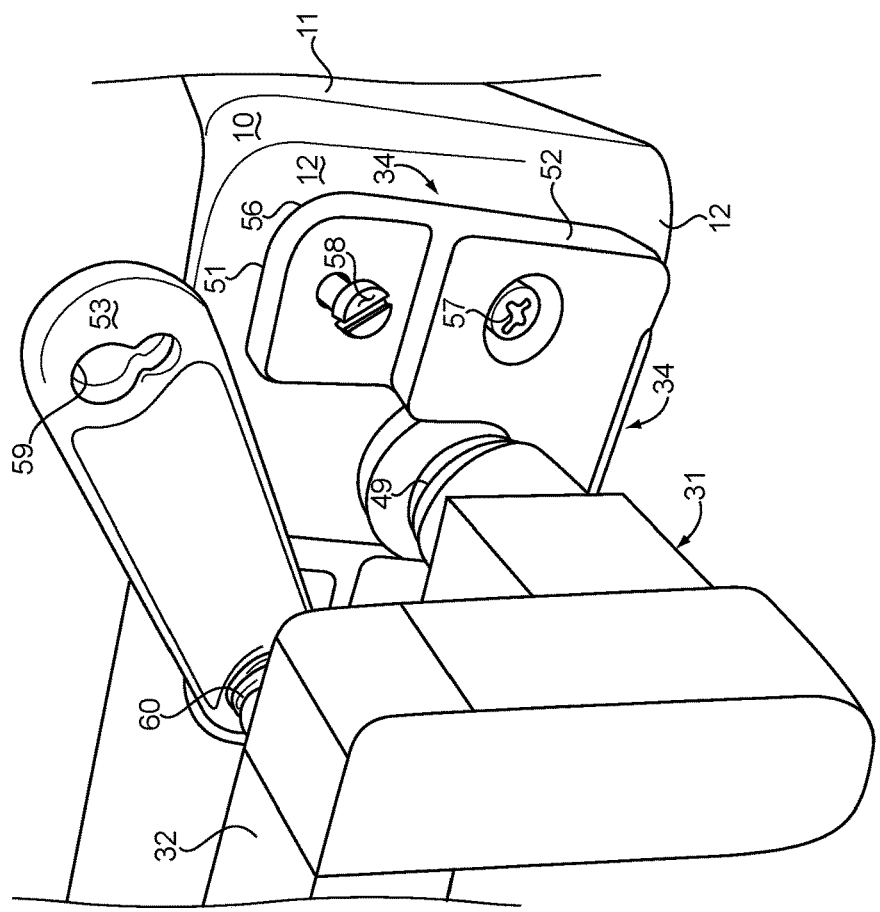
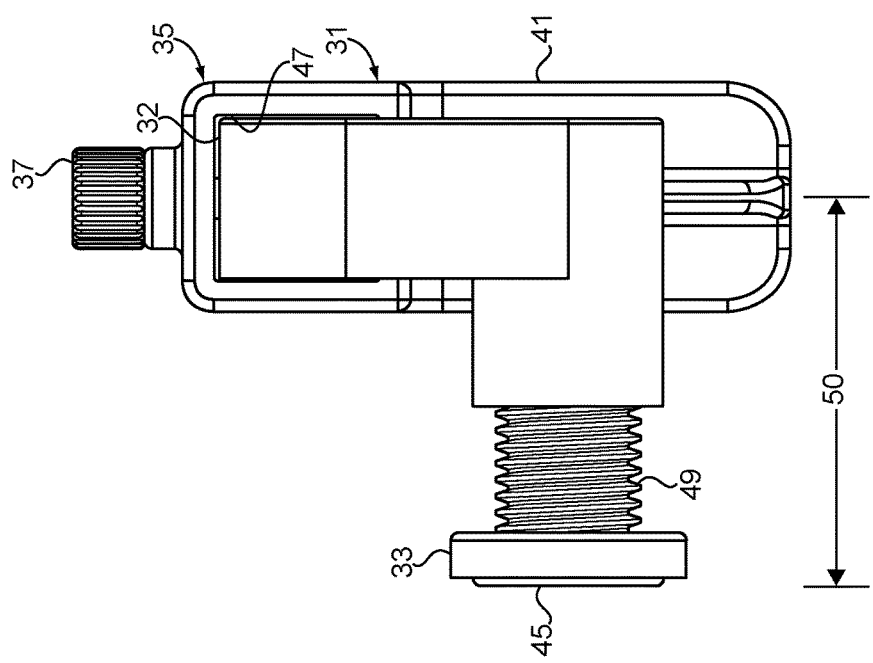
FIG. 5
FIG. 4

GAS OFF SECURITY DEVICE FOR GAS RANGE

TECHNICAL FIELD

The present disclosure relates generally to security devices for preventing gas ranges from being accidently turned on, and more particularly to a detachable cross bar with individual knob locks for each gas control knob of the gas range.

BACKGROUND

Gas ranges have been known and successfully used for cooking food in homes and commercial establishments for many decades. In a typical scenario, the gas range includes a housing with a front face through which a plurality of gas control knobs extend. Each of the gas control knobs controls a gas supply to one of a plurality of gas range burners positioned at a top surface of the housing. Each of the gas control knobs include a handle portion that typically has a vertical orientation when the gas control knob is in an off position. The gas for an individual burner may be turned on by rotating the gas control knob clockwise. In some rare instances, an individual can accidently bump into a gas control knob, or small children may unknowingly turn a gas control knob from an off position to an on position without the burner igniting. The outcome of these rare events can potentially be catastrophic with the leaked gas eventually accumulating and igniting.

The present disclosure is directed toward one or more of the problems set forth above.

SUMMARY

In one aspect, a gas off security device for a gas range includes a cross bar sized to span a control width of the gas range, and includes a left mount at one end and a right mount at an opposite end. The cross bar is horizontal when the left and right mounts are connected to the gas range. A plurality of knob locks are slidably mounted to the cross bar, and each defines a slot sized to receive a handle portion of one of the gas control knobs of the gas range. The slot is thinner than a diameter of the gas control knob, and includes at least one set screw for securing the knob lock at a selected location along a length of the cross bar corresponding to a location of one of the gas control knobs. The gas control knobs are blocked from being turned from an off position to an on position when the cross bar is mounted to the gas range and the handle portion of the gas control knob is received in the slot of one of the knob locks.

In another aspect, a gas range includes a housing with a front face and a top surface. Four gas range burners are positioned at the top surface. Four gas control knobs are rotatably mounted to the front face, and each gas control knob is operably coupled to control a respective one of the gas range burners. A gas off security device is movable with respect to the front face of the housing between a disabled configuration a cooking configuration. The gas control knobs are blocked from being turned from an off position to an on position when the handle portion of each respective gas control knob is received in the slot of one of the knob locks in the disabled configuration. The gas control knobs are free to turn from the off position to the on position when the gas off security device is disconnected from the gas range in the cooking configuration.

In still another aspect, a method of using a gas off security device includes connecting the left mount and the right mount to the gas range. The knob locks are slid on the cross bar to a position that corresponds to one gas control knob of the gas range. The knob locks are secured at their respective positions. Operation of the gas control knobs is disabled by moving the gas off security device with respect to the gas range to receive a respective handle portion of the gas control knobs in the slot of a respective one of the knob locks. Operation of the gas control knobs is enabled by moving the gas off security device with respect to the gas range to a position at which the knob locks are out of contact with the gas control knobs.

BRIEF DESCRIPTION OF THE DRAWINGS

FIG. 2 is a back side perspective view of a gas off security device according to the present disclosure;

FIG. 3 is a front view of the gas off security device of FIG. 2;

FIG. 4 is a left side view of the gas off security device of FIGS. 2 and 3;

FIG. 5 is a partial perspective view of a gas range with a latch bracket according to the present disclosure attached thereto.

DETAILED DESCRIPTION

Figure 1:
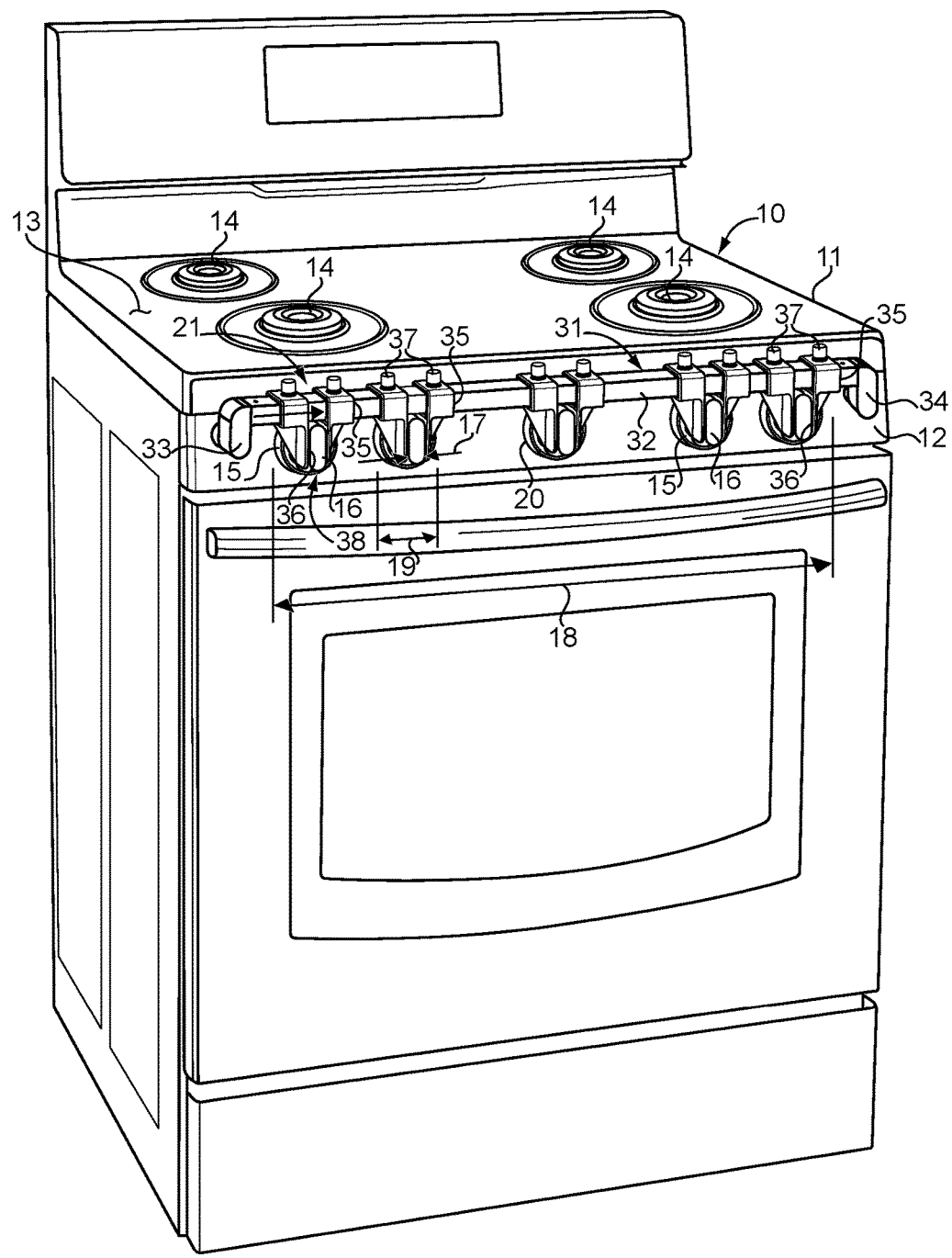
FIG. 1 is a perspective view of a gas range with a gas off security device connected thereto in a disabled configuration.

Referring initially to FIG. 1, a gas range 10 includes a housing 11 with a front face 12 and a top surface 13. Four gas range burners 14 are positioned at the top surface 13. Nevertheless, those skilled in the art will appreciate that the present invention could find potential application to gas ranges with as few as one burner, or as many as six or more burners without departing from the intended scope of the present disclosure. In the illustrated embodiment, the gas range 10 also includes an oven control knob 20, which controls temperature in a gas oven. Nevertheless, those skilled in the art will appreciate that the present disclosure also finds potential application to gas ranges that include an electric oven, or no oven feature at all. Four gas control knobs 15 are rotatably mounted to the front face 12, and each of the gas control knobs 15 is operably coupled to control a respective one of the gas range burners 14 in a manner well known in the art. A gas off security device 31 is removably connected to the front face 12 of the housing 11 in a range disabled configuration, and disconnected from the gas range in a cooking configuration.

Referring in addition to FIGS. 2-4, the gas off security device 31 includes a cross bar 32 sized to span a control width 18 of the gas range 10. Although cross bar 32 could have a circular cross section, it preferably has a keyed cross sectional shape 46, which is shown as being a square in the illustrated embodiment. The cross bar 38 can be constructed from any suitable materials, such as for instance a hollow square tubing that is cut to length. The control width 18 spans a sufficient width of the front face 12 to encompass all four gas range burners 14. Cross bar 32 includes a left mount 33 at one end and a right mount 34 at an opposite end. The cross bar 32 preferably has a horizontal orientation when the left and right mounts 33, 34 are connected to the gas range 10 as shown in FIG. 1. A plurality of knob locks 35 are slidably mounted to the cross bar 32, and each defines a slot 36 sized to receive a handle portion 16 of one gas control knob 15 of gas range 10. In the illustrated embodiment, five knob locks 35 are shown coupled to the four gas control knobs 15 and the oven control knob 20. The slot 36 is thinner than a diameter 19 of the gas control knob 15. In order to adjust a desirable positioning for each respective knob lock 35, each includes at least one set screw 37 for securing the knob lock 35 at a selected location 38 along a length of the cross bar 32 corresponding to a location 21 of one of the gas control knobs 15. Each respective gas control knob 15 is blocked from being turned from an off position, as shown, to an on position when the cross bar 32 is mounted to the gas range 10, and the handle portion 16 of the gas control knob 15 is received in the slot 36 of one of the knob locks 35. Those skilled in the art will appreciate that the gas control knobs 15 and the oven control knob 20 are free to turn from their respective off positions to an on position when the gas off security device 31 is disconnected from the gas range 10.

Although each knob lock 35 could be constructed as a single component without departing from the present disclosure, in the illustrated embodiment, each knob lock 35 includes a first slider 41 with a first set screw 37 and a second slider 42 with a second set screw 37. Each of the sliders 41, 42 includes a bar contact surface 43 and a knob contact surface 44. The first and second sliders 41 are independent of each other to selectively adjust a width 39 of the slot 36 to match a width 17 of handle portion 16 of each respective gas control knob 15.

Given the fact that most gas ranges 10 have a housing 11 made from ferromagnetic sheet metal, the present disclosure teaches inclusion of a permanent magnet 45 in each of the left mount 33 and the right mount 34 so that the gas off security device 31 can be easily connected and disconnected the gas range 10. In addition to having knob locks 35 with adjustable slots 36 to adapt to virtually any geometry of known gas control knobs 15, the present disclosure also teaches inclusion of a threaded stud 49 in each of the left mount 33 and right mount 34 in order to adjust a stand off distance 50 from the front face 12 of gas range 10 in order to accommodate different gas range geometries. Thus, through a simple rotation of the threaded studs 49, the appropriate stand off distance 50 for a given gas range 10 can be quickly adjusted and set.

As stated earlier, the cross bar 32 may have a keyed cross sectional shape 46, which is shown as a square. Each of the knob locks 35 may define an opening 47 (e.g., square opening) shaped to match the keyed cross sectional shape 46 to prevent the knob locks 35 from rotating with respect to cross bar 31 about an axis 48 defined by the cross bar 42.

Figure 6:
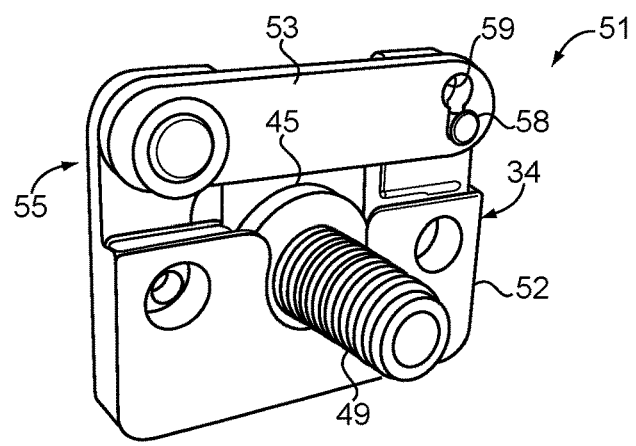
FIG. 6 is a front perspective view of the latch bracket in the closed position.
Figure 7:
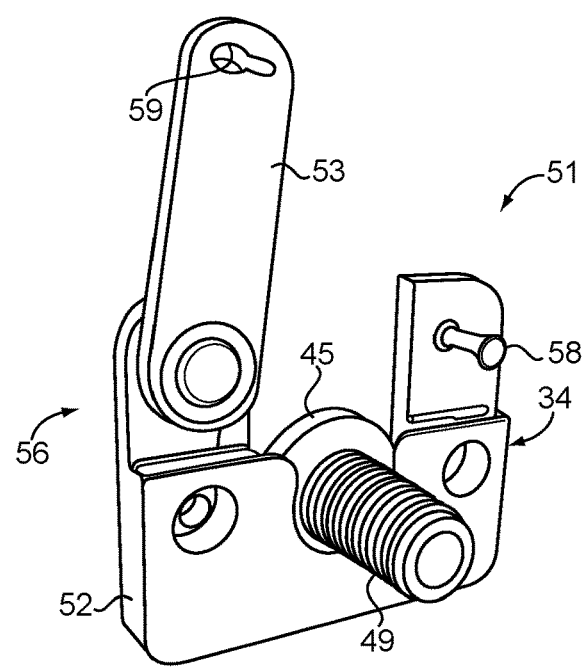
FIG. 7 is a perspective view of the latch bracket of FIG. 6 in an open position.

Referring now in addition to FIGS. 5-7, the gas off security device 31 of the present disclosure may be enhanced by modifying the left mount 33 and the right mount 34 to each include a latch bracket 51 that traps the cross bar 32 in a predetermined position and orientation on the gas range 10. In particular, each latch bracket 51 may include a latch body 52 and a latch arm 53 that is pivotally mounted to the latch body 52. The latch arm pivots between an open position 54 for receiving and removing the cross bar 32 and a closed position 55 that traps the cross bar 32. Although not necessary, the latch arm 53 may be brightly colored, such as painted red, so that a quick visual inspection can verify whether the respective latch bracket is in the open position 54 or the closed position 55. The latch brackets 51 may be configured for permanent attachment to the gas range 10 by including a range contact surface 56 and one or more fasteners 57 for attaching the latch body 52 to the front face 12 of gas range 10. In the illustrated embodiment, the latch brackets 51 are manufactured from suitable metallic components. However, the inclusion of plastic or other materials would also fall within the intended scope of the present disclosure.

Figure 8:
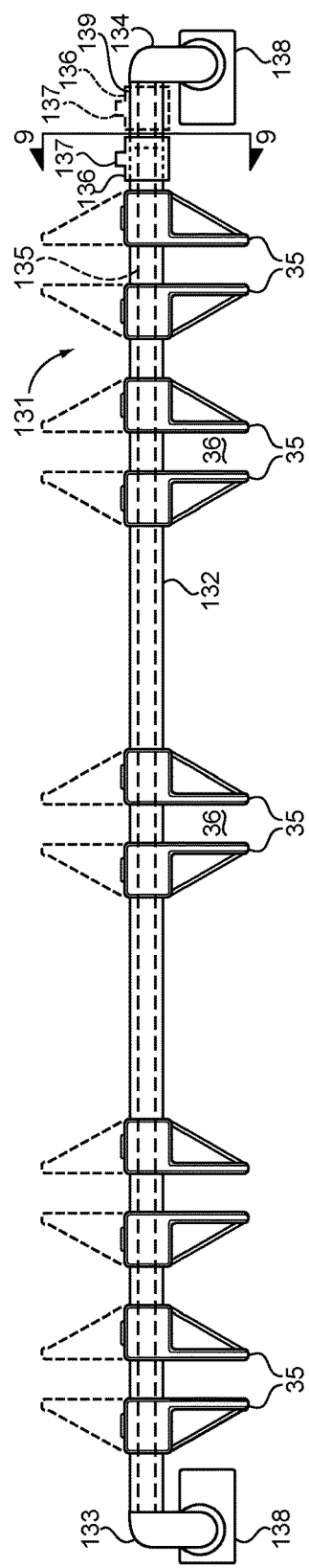
FIG. 8 is a front side schematic view of a gas off security device according to another embodiment of the present disclosure.
Figure 10:
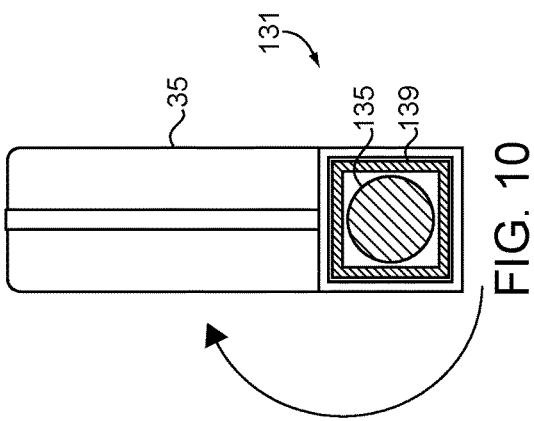
FIG. 10 is a view similar to FIG. 9 after the gas off security device has been moved to the cooking configuration.
Figure 9:
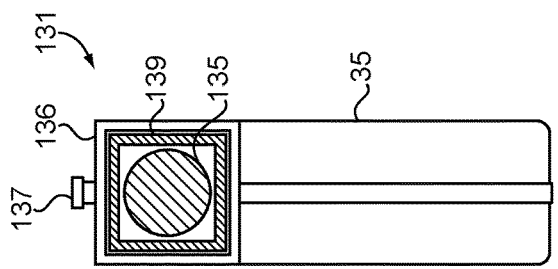
FIG. 9 is a sectioned view through the gas off security device of FIG. 8 as viewed along section lines 9-9.

Referring now to FIGS. 8-10, a gas off security device 131 according to another embodiment of the present disclosure differs from the earlier embodiments in that the cross bar 132 is rotated between disabled and cooking configurations, whereas the earlier embodiment showed the gas off security device 31 being disconnected from the gas stove when being moved from the disabled configuration to the cooking configuration. In this embodiment, the respective knob locks 35 that define the slots 36 for receiving the handle portions of the gas control knobs are substantially identical to those described earlier and their description will not be repeated here. In this embodiment, the cross bar 132 receives, and is supported by, a support rod 135 that extends between a left mount 133 and a right mount 134. Like the earlier embodiments, cross bar 132 has a square cross section that is hollow for receiving support rod 135. A short fixed bar stub 139 has a cross sectional shape similar to that of cross bar 132, but has a fixed orientation with respect to right mount 134. With this structure, a slide lock 136 can be moved from a position, as shown, that receives end portions of both the cross bar 132 and the fixed bar stub 139, to hold the cross bar 132 against rotation about support rod 135. When slide lock 136 is moved to the right to be no longer in contact with cross bar 132, cross bar 132 is free to rotate about support rod 135 from the disabled configuration as shown in FIGS. 8 & 9 to the cooking configuration as shown in FIG. 10 (and shown as dotted lines in FIG. 9). This embodiments also differs from the earlier embodiment in that the left mount 133 and the right mount 134 may be permanently attached to the front face of a gas stove using feet 138 and an appropriate adhesive material, such as 3M VHB tape.

INDUSTRIAL APPLICABILITY

The present disclosure finds general applicability to gas ranges. The present disclosure finds specific applicability to stand alone gas ranges that include one or more gas burners and may be a gas oven in a stand alone appliance.

A method of using a gas off security device 31 according to the present disclosure includes sliding each of the knob locks 35 on the cross bar 32 to a position that corresponds to one gas control knob 15 of the gas range 10. Next, the knob locks 35 are secured at their respective positions via set screws 37. The gas off security device 31 is moved to receive the respective handle portions 16 of the gas control knobs 15 in the slot 36 of a respective one of the knob locks 35. The gas control knobs 15 may or may not contact the cross bar 32, which is positioned directly above the handle portions 16. Operation of the gas control knobs is disabled by connecting the gas off security device 31 to the gas range 10, such as by magnetically coupling the permanent magnets 45 to the front face 12 of housing 11. Operation of the gas control knobs 15 is enabled by disconnecting the gas off security device 31 from the gas range 10, such as by magnetically decoupling the permanent magnets 45 from the housing 11 and setting the gas off security device 31 aside while the gas range 10 is in use. Although not necessary, the width 39 of each slot 36 can be adjusted to match a width 17 of the handle portion 16 of the respective gas control knob 15. This feature enables the gas off security device 31 to be manufactured as a one size fits all via both the width adjustment feature and the stand off distance 50 adjustment feature provided by the threaded studs 49. In the event that the left and right mounts 33, 34 are enhanced via the use of latch brackets 51, the cross bar 32 may be trapped in the latch brackets 51, which may be attached to the housing 11 of gas range 10 in a suitable manner.

In the case of the embodiment shown in FIGS. 8-10, the gas off security device 131 is changed from the disabled configuration to the cooking configuration by moving slide lock 136 out of contact with cross bar 132 so that cross bar 132 and the respective knob locks 35 can rotate out of contact with the gas control knobs of the gas range. The slide lock 136 may include a set screw 137 for fixing the position of slide lock 136 along an axis defined by support rod 135, which preferably has a circular cross section. Thus, slide lock 136 along with set screw 137 can be used to fix the orientation of the knob locks 35 about an axis defined by support rod 135 in either the disabled configuration shown in FIGS. 8 & 9, or the cooking configuration shown with dotted lines in FIG. 8 and shown in FIG. 10.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A gas off security device for a gas range comprising:
   a cross bar sized to span a control width of a gas range and including a left mount at one end and a right mount at an opposite end, and wherein the cross bar is horizontal when the left and right mounts are connected to the gas range;
   a plurality of knob locks slidably mounted to the cross bar, and each defining a slot sized to receive a handle portion of one gas control knob of the gas range, and the slot being thinner than a diameter of the gas control knob, and further including at least one setscrew for securing the knob lock at a selected location along a length of the cross bar corresponding to a location of one of the gas control knobs;
   wherein the gas control knob is blocked from being turned from an off position to an on position when the cross bar is mounted to the gas range and the handle portion of the gas control knob is received in the slot of one of the knob locks;
   wherein each of the knob locks includes a first slider with a first setscrew and a second slider with a second set screw, and each of the sliders includes a bar contact surface and a knob contact surface; and
   and the first and second sliders being independent of each other to selectively adjust a width of the slot to match a width of the handle portion of the gas control knob.

2. The gas off security device of claim 1 wherein each of the left mount and the right mount includes a permanent magnet for connecting the cross bar to the gas range.

3. The gas off security device of claim 1 wherein the cross bar has keyed cross sectional shape, and each of the knob locks defines an opening shaped to match the keyed cross sectional shape to prevent the knob locks from rotating with respect to the cross bar about an axis defined by the cross bar.

4. A gas off security device for a gas range comprising:
   a cross bar sized to span a control width of a gas range and including a left mount at one end and a right mount at an opposite end, and wherein the cross bar is horizontal when the left and right mounts are connected to the gas range;
   a plurality of knob locks slidably mounted to the cross bar, and each defining a slot sized to receive a handle portion of one gas control knob of the gas range, and the slot being thinner than a diameter of the gas control knob, and further including at least one setscrew for securing the knob lock at a selected location along a length of the cross bar corresponding to a location of one of the gas control knobs; and
   wherein the gas control knob is blocked from being turned from an off position to an on position when the cross bar is mounted to the gas range and the handle portion of the gas control knob is received in the slot of one of the knob locks;
   wherein the cross bar has keyed cross sectional shape, and each of the knob locks defines an opening shaped to match the keyed cross sectional shape to prevent the knob locks from rotating with respect to the cross bar about an axis defined by the cross bar;
   wherein each of the knob locks includes a first slider with a first setscrew and a second slider with a second set screw, and each of the sliders includes a bar contact surface and a knob contact surface; and
   and the first and second sliders being independent of each other to selectively adjust a width of the slot to match a width of the handle portion of the gas control knob.

5. The gas off security device of claim 4 wherein each of the left mount and the right mount includes a permanent magnet for connecting the cross bar to the gas range.

6. The gas off security device of claim 1 wherein each of the left mount and the right mount includes a latch bracket that traps the cross bar in a predetermined position and orientation on the gas range.

7. A gas off security device for a gas range comprising:
   a cross bar sized to span a control width of a gas range and including a left mount at one end and a right mount at an opposite end, and wherein the cross bar is horizontal when the left and right mounts are connected to the gas range;
   a plurality of knob locks slidably mounted to the cross bar, and each defining a slot sized to receive a handle portion of one gas control knob of the gas range, and the slot being thinner than a diameter of the gas control knob, and further including at least one setscrew for securing the knob lock at a selected location along a length of the cross bar corresponding to a location of one of the gas control knobs;
   wherein the gas control knob is blocked from being turned from an off position to an on position when the cross bar is mounted to the gas range and the handle portion of the gas control knob is received in the slot of one of the knob locks;
   wherein each of the left mount and the right mount includes a latch bracket that traps the cross bar in a predetermined position and orientation on the gas range;
   wherein each of the latch brackets includes a latch body and a latch arm pivotally mounted to the latch body;

the latch arm pivots between an open position for receiving and removing the cross bar, and a closed position that traps the cross bar; and the latch bracket includes a range contact surface and a pair of fasteners for attaching the latch body to the gas range.

8. The gas off security device of claim 7 wherein each of the left mount and the right mount includes a permanent magnet for connecting the cross bar to the gas range.

9. The gas off security device of claim 1 wherein the cross bar receives a support rod extending between the left mount and the right mount; and the cross bar is rotatable about the support rod between a disabled configuration and a cooking configuration.

10. A gas range comprising:

a housing, having a front face and a top surface;

four gas range burners positioned at the top surface;

four gas control knobs rotatably mounted to the front face, and each gas control knob being operably coupled to control a respective one of the gas range burners;

a gas off security device being movable with respect, to the front face of the housing between a disabled configuration and a cooking configuration;

wherein the gas off security device includes a cross bar sized to span a control width of a gas range, and including a left mount at one end and a right mount at an opposite end that are each connected to the front face in the disabled configuration, and the gas security device further includes a plurality of knob locks slidably mounted to the cross bar, and each defining a slot sized to receive a handle portion of one of the gas control knobs, and the slot being thinner than a diameter of the gas control knob; and wherein the gas control knobs are blocked from being turned from an off position to an on position when the handle portion of each respective gas control knob is received in the slot of one of the knob locks in the disabled configuration;

wherein the gas control knobs are free to turn from the off position to the on position when the gas off security device is in the cooking configuration;

wherein each of the knob locks includes a first slider with a first setscrew and a second slider with a second set screw, and each of the sliders includes a bar contact surface and a knob contact surface; and and the first and second sliders being independent of each other to selectively adjust a width of the slot to match a width of the handle portion of the gas control knob.

11. The gas range of claim 10 wherein each of the left mount and the right mount includes a permanent magnet for connecting the cross bar to the gas range.

12. The gas off security device of claim 11 wherein the cross bar has square cross sectional shape, and each of the knob locks defines an opening shaped to match the square cross sectional shape to prevent the knob locks from rotating with respect to the cross bar about an axis defined by the cross bar.

13. The gas range of claim 12 wherein each of the left mount and the right mount includes a latch bracket that traps the cross bar in a predetermined position and orientation on the gas range.

14. A gas range comprising:

a housing having a front face and a top surface;

four gas range burners positioned at the top surface;

four gas control knobs rotatably mounted to the front face, and each gas control knob being operably coupled to control a respective one of the gas range burners;

a gas off security device being movable with respect to the front face of the housing between a disabled configuration and a cooking configuration;

wherein the gas off security device includes a cross bar sized to span a control width of a gas range, and including a left mount at one end and a right mount at an opposite end that are each connected to the front face in the disabled configuration, and the gas security device further includes a plurality of knob locks slidably mounted to the cross bar, and each defining a slot sized to receive a handle portion of one of the gas control knobs, and the slot being thinner than a diameter of the gas control knob; and wherein the gas control knobs are blocked from being turned from an off position to an on position when the handle portion of each respective gas control knob is received in the slot of one of the knob locks in the disabled configuration;

wherein the gas control knobs are free to turn from the off position to the on position when the gas off security device is in the cooking configuration;

wherein the cross bar receives a support rod extending between the left mount and the right mount; and the cross bar is rotatable about the support rod between the disabled configuration and the cooking configuration.

15. A method of using a gas off security device that includes a cross bar with a left mount at one end and a right mount at an opposite end, and a plurality of knob locks slidably mounted to the cross bar, and each defining a slot, and each of the knob locks including at least one setscrew for securing the knob lock at a selected location along a length of the cross bar, the method comprising the steps of:

connecting the left mount and the right mount to a gas range;

sliding each of the knob locks on the cross bar to a position that corresponds to one gas control knob of the gas range;

securing each of the knob locks at the respective position;

disabling operation of the gas control knobs by moving the gas off security device with respect to the gas range to receive a respective handle portion of the gas control knobs in the slot of a respective one of the knob locks;

enabling operation of the gas control knobs by moving the gas off security device with respect to the gas range to a position at which the knob locks are out of contact with the gas control knobs;

wherein each of the left mount and the right mount includes a permanent magnet;

the disabling step includes magnetically coupling the permanent magnets to a housing of the gas range; and the enabling step includes magnetically decoupling the permanent magnets from the housing.

16. The method of claim 15 including a step of adjusting a width of the slot of each of the knob locks to match a width of the handle portion of the respective gas control knob.

17. The method of claim 15 wherein the disabling step includes rotating the cross bar about a support rod extending between the left mount and the right mount to an orientation at which the knob locks are in contact with the respective gas control knobs; and the enabling step includes rotating the cross bar about the support rod to an orientation at which the knob locks are out of contact with the respective gas control knobs.

* * * * *